United States Patent [19]
Luteran

[11] 3,944,845
[45] Mar. 16, 1976

[54] LIQUID LEVEL SHUTOFF CONTROL

[76] Inventor: Frank Kenneth Luteran, 10 Charles St., Auburn, N.Y. 13021

[22] Filed: Sept. 9, 1974

[21] Appl. No.: 504,310

[52] U.S. Cl. ............ 307/118; 340/244 C; 73/304 R
[51] Int. Cl.² ........................................ H01H 35/18
[58] Field of Search ............... 307/118, 116, 117; 317/DIG. 3; 73/304 R, 304 C; 340/244 C, 244 R

[56] References Cited
UNITED STATES PATENTS

| | | | |
|---|---|---|---|
| 3,206,615 | 9/1965 | La Pointe | 73/304 R |
| 3,680,070 | 7/1972 | Nystuen | 340/244 C |

*Primary Examiner*—James R. Scott
*Assistant Examiner*—M. Ginsburg

[57] ABSTRACT

A liquid level shutoff control for minimum level control of conductive fluids. A pair of electrodes are disposed in the liquid at the minimum level desired for the fluid. The electrodes provide a conductive path for a high frequency electrical signal and circuits energize a controlled load such as a liquid heating or mixing apparatus whenever the electrodes are in contact with the fluid. Failure of the control circuit results in shut off of the controlled load thereby providing fail-safe minimum level control.

9 Claims, 2 Drawing Figures ly 3,944,845

LIQUID LEVEL SHUTOFF CONTROL

BACKGROUND OF THE INVENTION

In the area of liquid level sensing devices, mechanical or float systems are the most widely used. These devices when coupled with levers, relays, and switches can be used to provide a shutoff signal when the liquid falls below a minimum level. The reliability of these systems is limited and, therefore, have been replaced in some installations by electrical level sensing systems. These systems generally rely upon the attenuation of an electrical signal by the conductive liquid to activate a controlled load such as a heater. Failure of this type control system will result in the controlled load being continuously activated when the liquid falls below the minimum level.

Other systems which rely upon the conduction of 60 cycle leakage currents through the conductive fluid to activate a controlled load suffer from erratic control indications due to 60 cycle hum pickup in the probe wiring. Other available conducting systems of the D.C. type cause electrolysis of the conducting liquid due to the passage of a D.C. current through the liquid.

OBJECTS AND SUMMARY OF THE INVENTION

The present invention provides an improved liquid level shutoff control apparatus which obviates the previously described disadvantages of devices of the prior art.

It is a further objective of the present invention to provide a low liquid control that contains no mechanical contacts in the control loop and is therefore capable of being encapsulated to protect it from severe environments.

Another objective of the invention is to provide a shutoff control that does not require special probes for immersion in the liquid.

A further objective of the invention is to provide a low current liquid level shutoff control that is intrinsically shockproof.

The present invention performs the liquid level shutoff control function by utilizing the conductive property of a liquid to conduct a high frequency signal between two probes in contact with the liquid. The conduction between the probes causes a switching circuit to be actuated and enable a load to be energized. The load is energized only while the probes are in contact with the conducting liquid. Upon failure of the high frequency generating circuit, the probes or the switching circuit will de-energize the load. The location of the probe determines the minimum fluid level at which the load will be energized.

DESCRIPTION OF THE PREFERRED EMBODIMENT

Figure 1:
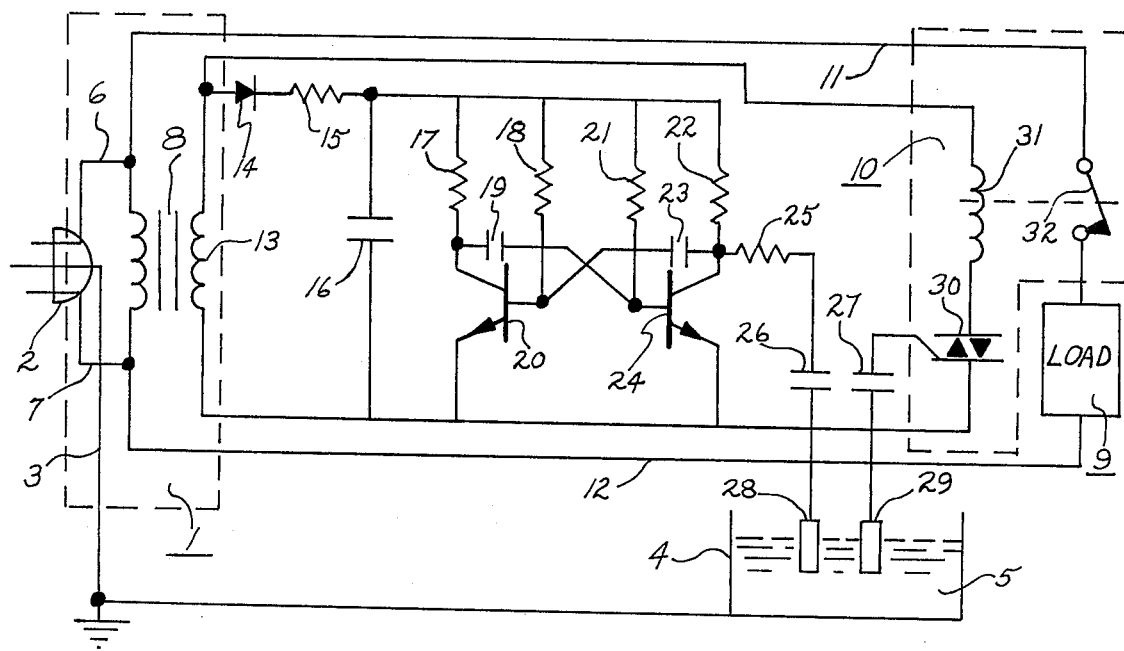
FIG. 1 is a schematic diagram of the electrical circuits providing low liquid level cut-off in a grounded enclosure.

In FIG. 1 power source 1 is supplied 60 cycle power through plug 2. Ground lead 3 is connected to enclosure 4 which is filled with conducting liquid 5. Power leads 6 and 7 are connected to the primary circuit of isolation transformer 8. Power lead 6 is further connected by lead 11 to switching circuit 10. Power lead 7 is further connected by lead 12 to load 9. One lead of secondary winding 13 of isolation transformer 8 is connected to switching circuit 10 and diode 14. The other lead of winding 13 is connected to the common side of the transistor circuits and power switching circuit 10. Diode 14 and resistor 15 provide a reduced rectified current to charge capacitor 16. Capacitor 16 provides a D.C. voltage to the multivibrator composed of elements 17, 18, 19, 20, 21, 22, 23, and 24. The multivibrator produces a high frequency square wave signal through limiting resistor 25 and coupling capacitor 26 to input probe 28 immersed in conductive liquid 5. The high frequency signal is conducted through liquid 5 to output probe 29 through coupling capacitor 27 to the gate of triac 30 in switching circuit 10. The high frequency signal on the gate of triac 30 causes 60 cycle current to flow through triac 30, relay coil 31, and primary circuit 13. Current flow through coil 31 causes relay contacts 32 to close and connect load 9 across power leads 6 and 7. Load 9 is therefore energized when probes 28 and 29 are contacting conducting fluid 5 which is present in grounded enclosure 4.

Figure 2:
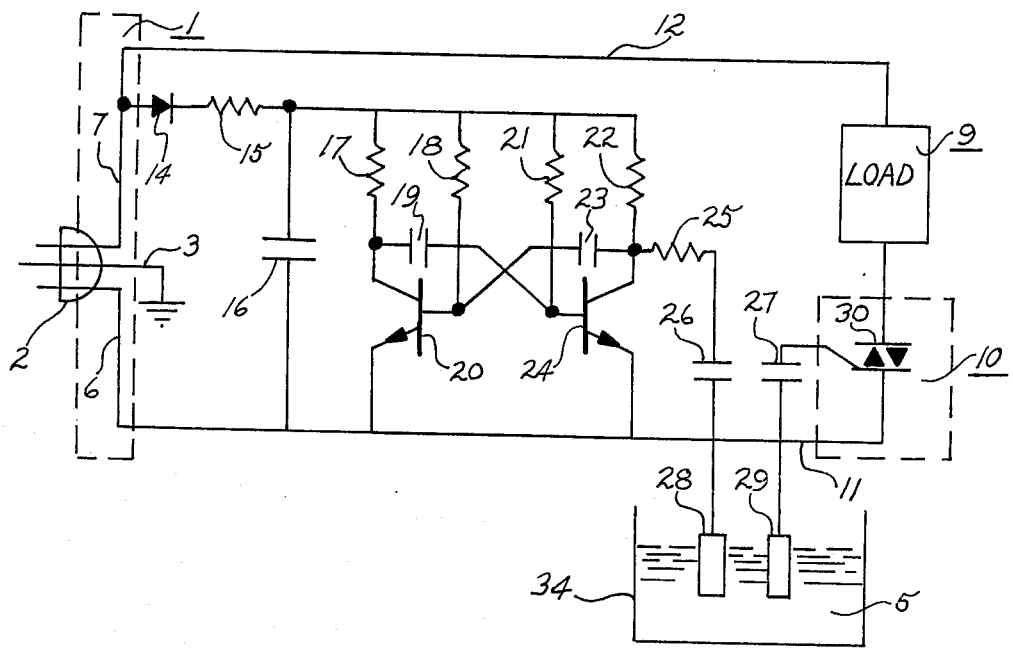
FIG. 2 is a schematic diagram of the electrical circuits providing low liquid level cut-off in an ungrounded enclosure.

In FIG. 2 power source 1 is supplied 60 cycle power through plug 2. Ground lead 3 is connected to ground. Power lead 7 is connected to diode 14 and load 9. Power lead 6 is connected to the common side of the transistor circuits and switching circuit 10. Diode 14 and resistor 15 provide a reduced rectified circuit to charge capacitor 16. Capacitor 16 provides a D.C. voltage to the multivibrator composed of elements 17, 18, 19, 20, 21, 22, 23, and 24. The multivibrator produces a high frequency square wave signal through limiting resistor 25 and coupling capacitor 26 to input probe 28 immersed in conductive liquid 5 which is present in non-grounded enclosure 34. The high frequency signal is conducted through liquid 5 to output probe 29 through coupling capacitor 27 to the gate of triac 30 in switching circuit 10. The high frequency signal on the gate of triac 30 causes 60 cycle current to flow through triac 30, load 9 and through power leads 6 and 7. Load 9 is therefore energized when probes 28 and 29 are contacting fluid 5 which is present in ungrounded enclosure 34.

The circuits shown in FIG. 1 and FIG. 2 perform identical functions in regard to providing a D.C. voltage for the multivibrator circuit which produces the high frequency square wave, providing a conductive path through the probes and conductive fluid to the switching circuit; and connecting a load to the 60 cycle power line whenever there is conduction between the probes.

The isolation transformer 8 is required when the liquid is connected to ground through the enclosure itself or through connecting pipes and accessories. The isolation transformer prevents the high frequency signal from the input probe from being conducted to ground rather than to the output probe. The relay in the switching circuit is required to prevent the load from cancelling the effect of the isolation transformer. The triggering of the triac with a high frequency signal is novel and performance is reliable when the rise time of the high frequency signal is less than the turn-off time of the triac. Coupling capacitors 26 and 27 are selected to present a high impedance to 60 cycle currents and a low impedance to the high frequency signals, thereby making the circuit immune to the 60 cycle leakage currents and preventing 60 cycle currents from being injected into the liquid where they may present a shock hazard to operating personnel.

I claim:

1. A system for energizing a load from a power line when the level of a conductive liquid is above a preset point comprising:
   a. electrical energy means producing a D.C. voltage and an A.C. voltage from the power line,
   b. signal generating means connected to the electrical energy means and in response to the D.C. voltage applied thereto producing a high frequency signal,
   c. an input conductive probe contacting the liquid and coupled to the signal generating means,
   d. an output conductive probe contacting the liquid and providing a conductive path for the high frequency signal from the input conductive probe through the liquid to the output conductive probe,
   e. switching means coupled to the electrical energy means and to the output conductive probe for connecting the load across the A.C. voltage whenever conduction of the high frequency signal occurs from the input conductive probe to the output conductive probe.

2. The combination of claim 1 wherein the input conductive probe is capacitively coupled to the signal generating means and the output conductive probe is capacitively coupled to the switching means.

3. The combination of claim 1 wherein the switching means includes a triac energized by the high frequency signal.

4. The combination of claim 1 wherein the electrical energy means includes an isolation transformer for producing the A.C. and D.C. voltages and the switching means includes a relay having a pair of relay contacts for connecting the load across the power line.

5. The combination of claim 4 wherein the switching means includes a triac and the relay is energized by the triac and the load is connected across the power line through the relay contacts.

6. The combination of claim 1 wherein the electrical energy means includes a diode half wave rectifier and filter capacitor to produce the D.C. voltage.

7. The combination of claim 6 wherein the electrical energy means further includes a resistor in series with the diode to reduce the D.C. voltage applied to the filter capacitor.

8. The combination of claim 1 wherein a resistor is serially connected between the input conductive probe and the signal generating means to limit the high frequency signal flowing through the liquid.

9. The combination of claim 1 wherein the signal generating means includes a transistorized multivibrator.

* * * * *